(12) United States Patent
Burke et al.

(10) Patent No.: US 6,470,662 B1
(45) Date of Patent: Oct. 29, 2002

(54) MULTIPLE BLADE CUTTING APPARATUS FOR ROTARY LAWN MOWER

(76) Inventors: Terry A. Burke, 6204 Beechdale Ct., Derwood, MD (US) 20855; James E. Walker, Jr., 13136 Valley Wood Dr., Silver Spring, MD (US) 20906

( * ) Notice: Subject to any disclaimer, the term of this patent is extended or adjusted under 35 U.S.C. 154(b) by 0 days.

(21) Appl. No.: 09/699,335

(22) Filed: Oct. 31, 2000

(51) Int. Cl.$^7$ ............................................... A01D 34/73
(52) U.S. Cl. .......................................... 56/255; 56/295
(58) Field of Search ........................ 56/255, 17.5, 169, 56/295, 320.2, 320.1, DIG. 17, DIG. 20

(56) References Cited

U.S. PATENT DOCUMENTS

| | | | |
|---|---|---|---|
| 3,103,093 A | | 9/1963 | House, Jr. |
| 3,343,350 A | | 9/1967 | Freedlander et al. |
| 3,343,355 A | | 9/1967 | Freedlander et al. |
| 3,910,017 A | * | 10/1975 | Thorud et al. ................ 56/295 |
| 4,250,621 A | | 2/1981 | Houle |
| D280,903 S | | 10/1985 | Barbula |
| 5,033,259 A | * | 7/1991 | Adcock ........................ 56/295 |
| 5,109,656 A | | 5/1992 | Zimmer |
| 5,209,052 A | | 5/1993 | Carroll |
| 5,233,820 A | * | 8/1993 | Willsie ......................... 56/255 |
| D340,462 S | | 10/1993 | Cowart |
| 5,287,686 A | | 2/1994 | Lindsay |
| 5,321,940 A | * | 6/1994 | Peterson ....................... 56/255 |
| 5,363,635 A | * | 11/1994 | White, III et al. ............ 56/255 |
| 5,619,847 A | | 4/1997 | Cox, Jr. |
| 5,711,141 A | | 1/1998 | Pitman |
| 6,145,290 A | * | 1/1998 | Sillivan ........................ 56/255 |
| 5,899,053 A | | 5/1999 | Roth |

FOREIGN PATENT DOCUMENTS

| | | |
|---|---|---|
| CA | 645879 | 7/1962 |
| EP | 747595 | 4/1956 |
| GB | 2023390 | 1/1980 |

* cited by examiner

Primary Examiner—Robert E. Pezzuto
Assistant Examiner—Árpád F Kovács
(74) Attorney, Agent, or Firm—Richard C. Litman

(57) ABSTRACT

A blade cutting apparatus for a rotary lawn mower. The blade cutting apparatus is defined by a plurality of blades projecting radially outward from a central hub. Each blade is defined by a first portion and a second portion, the first portion being defined by a first edge and a second edge and the second portion being defined by a third edge and a fourth edge. The first and third edges are each sharpened for enabling each blade to cut grass in two separate locations along the length of each strand of grass. Each blade is further defined by an elongated slot formed therein between the first portion and the second portion for allowing cut grass and debris to pass through each blade.

3 Claims, 4 Drawing Sheets

MULTIPLE BLADE CUTTING APPARATUS FOR ROTARY LAWN MOWER

BACKGROUND OF THE INVENTION

1. Field of the Invention

The present invention relates generally to an improved blade arrangement for rotary lawn mowers and, more particularly, to a multiple blade cutting apparatus for improved cutting performance in conventional rotary lawn mowers.

2. Description of Related Art

Several known blade cutting apparatuses are designed for use in conventional rotary-type lawn mowers. For example, U.S. Pat. No. 3,103,093, issued on Sep. 10, 1963 to W. H. House, Jr., describes a rotary cutting blade that may be readily removed by an operator, reversed, or turned over to provide a sharper cutting edge. U.S. Pat. No. 3,343,350 and U.S. Pat. No. 3,343,355, issued on Sep. 26, 1967 to A. L. Freedlander et al., describes a flexible elastomeric lawn mower blade adaptable for mounting on a power driven rotary lawn mower. U.S. Pat. No. 5,209,052, issued on May 11, 1993 to W. R. Carroll, describes a cutting and mulching blade assembly for rotary-type lawn mowers. U.S. Pat. No. 4,250,621, issued on Feb. 17, 1981 to E. R. Houle, describes a safety cutter blade for a rotary trimmer. U.S. Pat. No. 5,109,656, issued on May 5, 1992 to R. T. Zimmer, describes a rotary cutting mechanism having crossed blades mounted one above the other on a common shaft. U.S. Pat. No. 5,287,686, issued on Feb. 22, 1994 to D. P. Lindsay, describes an improved blade member for rotary lawn mower. U.S. Pat. No. 5,711,141, issued on Jan. 27, 1998, describes a reversible mower blade. U.S. Pat. No. 5,899,053, issued on May 4, 1999 to S. A. Roth, describes a new lawn mower blade for improving the cutting edge to produce a more efficient cutting area.

However, none of the above inventions describe a blade cutting apparatus having a plurality of blades, wherein each blade includes a plurality of cutting edges for producing more efficient cutting per revolution of the blade cutting apparatus.

None of the above inventions and patents, taken either singly or in combination, is seen to describe the instant invention as claimed.

SUMMARY OF THE INVENTION

The present invention is a blade cutting apparatus for a rotary lawn mower. The blade cutting apparatus is defined by a plurality of blades projecting radially outward from a central hub. Each blade is defined by a first portion and a second portion, the first portion being defined by a first edge and a second edge and the second portion being defined by a third edge and a fourth edge. The first and third edges are each sharpened for enabling each blade to cut grass in two separate locations along the length of each strand of grass. Each blade is further defined by an elongated slot formed therein between the first portion and the second portion for allowing cut grass and debris to pass through each blade.

Accordingly, it is a principal object of the invention to provide a blade cutting apparatus for rotary lawn mowers with improved cutting performance over conventional blade cutting apparatuses of this type.

It is another object of the invention to provide a blade cutting apparatus for rotary lawn mowers having a plurality of cutting edges.

It is a further object of the invention to provide a blade cutting apparatus for rotary lawn mowers that is reversible.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
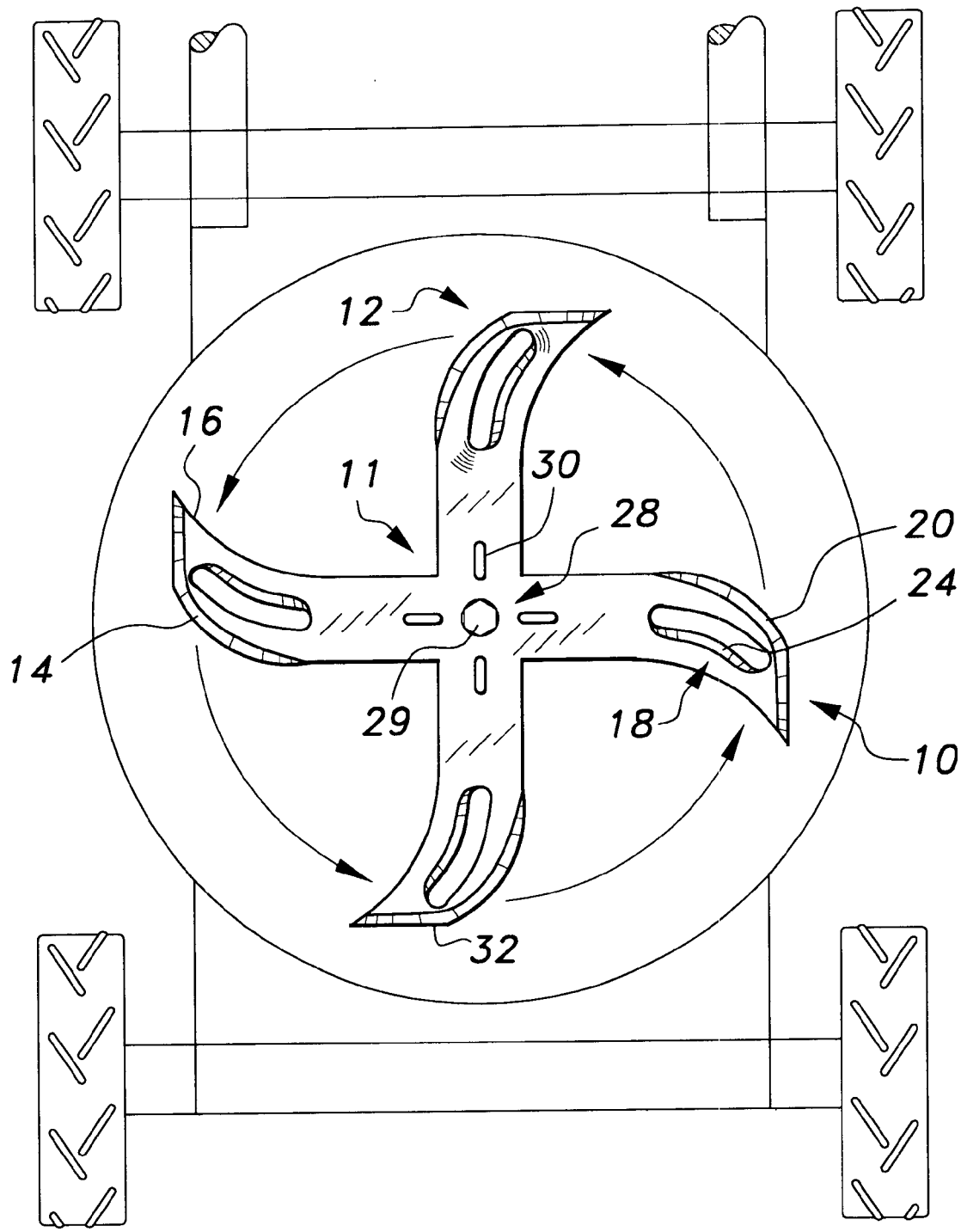
FIG. 1a is an environmental, plan view of a first side of a multiple blade cutting apparatus according to a first preferred embodiment of the present invention.
Figure 1B:
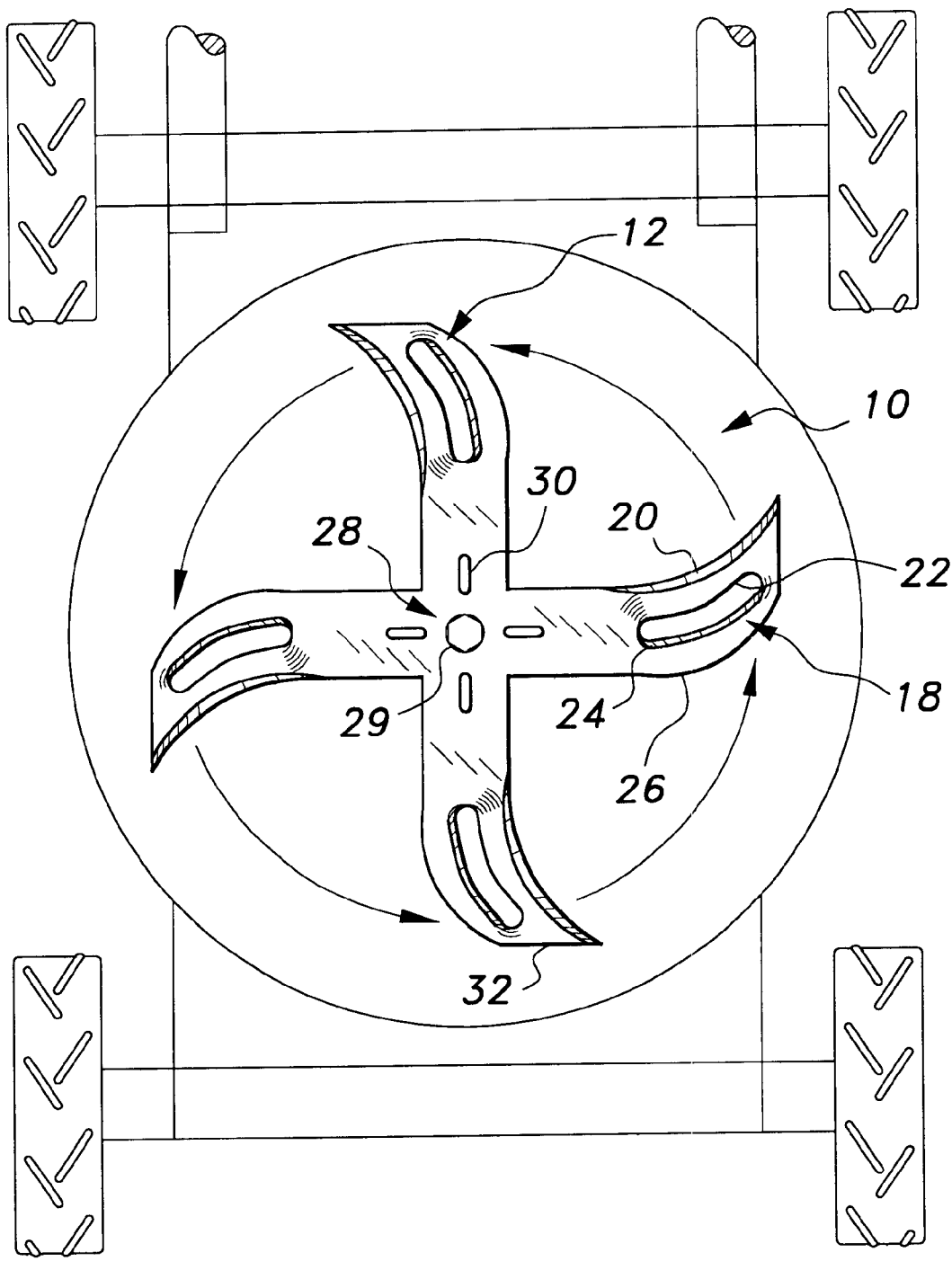
FIG. 1b is an environmental, plan view of a second side of a multiple blade cutting apparatus according to a first preferred embodiment of the present invention.

The present invention is a blade cutting apparatus for rotary lawn mowers. A blade cutting apparatus 10 according to a first preferred embodiment is shown in FIGS. 1a and 1b. FIGS. 1a and 1b each show a view of the blade cutting apparatus 10 from an opposing side from the other. Preferably, the blade cutting apparatus 10 is approximately twenty-two inches in diameter. The blade cutting apparatus 10 is defined by a plurality of blades 12 projecting radially outward from a central portion 11 of the apparatus 10. Each blade preferably has a lateral dimension of approximately 2.75 to 3 inches. The first embodiment shows the blade cutting apparatus 10 having four blades 12 formed therein. By contrast, a second embodiment of the blade cutting apparatus 10 shown in FIG. 2 has only two blades 12. Except for the number of blades 12, the first and second embodiments of the blade cutting apparatus 10 are identical.

For purposes of illustrating preferred modes of implementing, the present invention, the blade cutting apparatus 10 is shown to rotate in a counter-clockwise fashion when installed on a conventional rotary lawn mower. However, it is understood that a similar blade cutting apparatus defined by a configuration that is the mirror image of the apparatus 10 shown in FIGS. 1 & 2 may also used if the direction of rotation of a rotary lawn mower is reversed.

Figure 2:
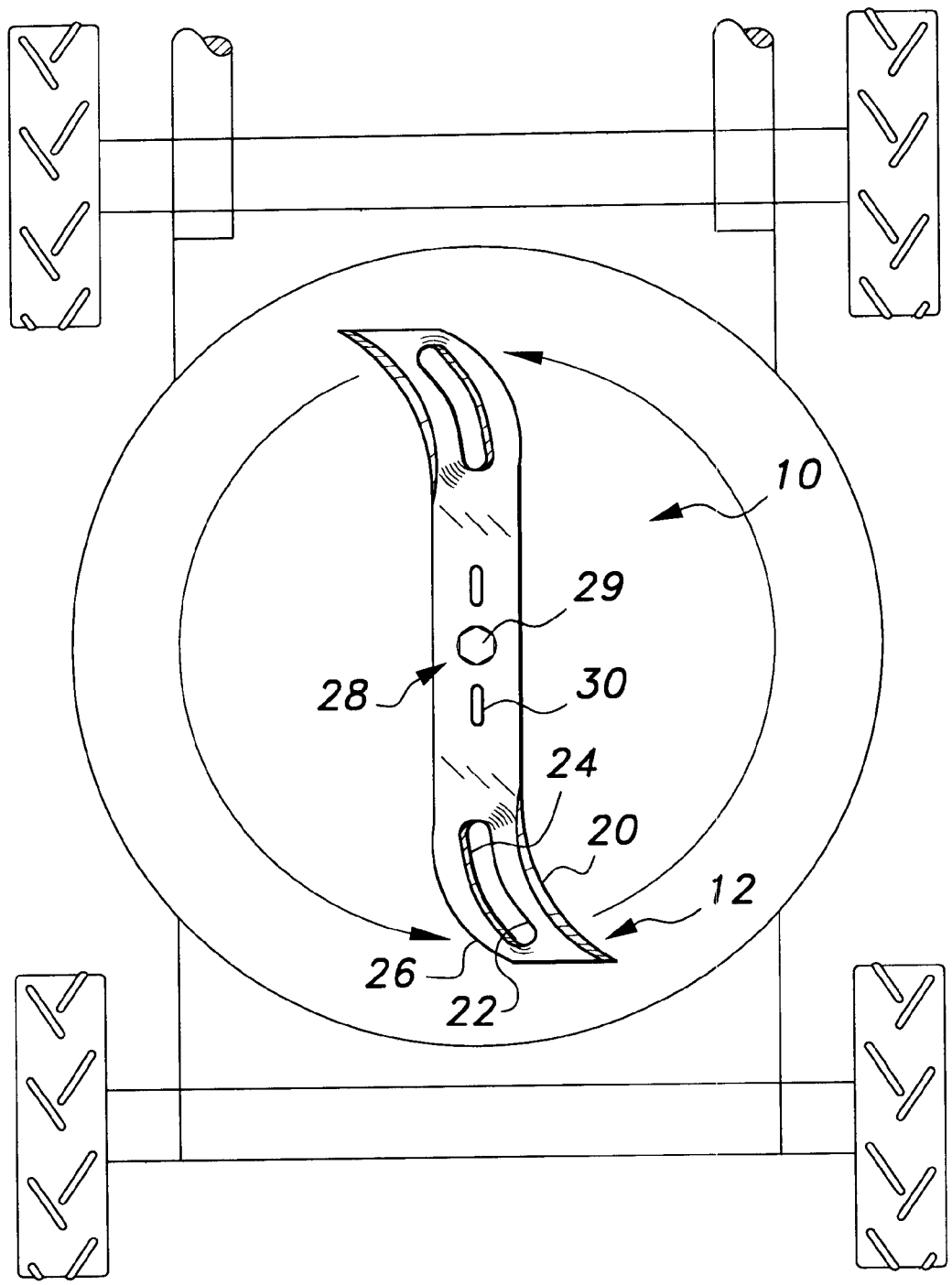
FIG. 2 is an environmental, plan view of a second side of a multiple blade cutting apparatus according to a second preferred embodiment of the present invention.
Figure 3:
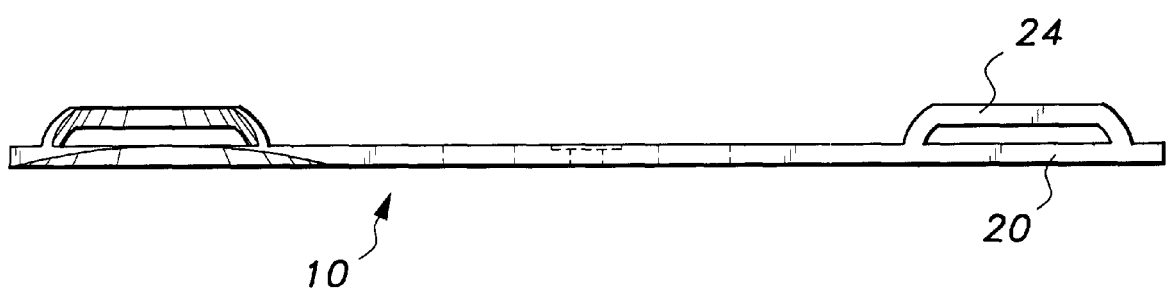
FIG. 3 is an elevational view of a multiple blade cutting apparatus according to the second preferred embodiment of the present invention.

Based on the preferred embodiments shown in FIGS. 1–3, references are made in this application to a "leading" portion or edge and a "trailing" portion or edge. In this context, "leading" refers to that portion of one of the blades 12 that will pass a predefined point first in the plane of rotation of the blade cutting apparatus 10 about a fixed axis through the axis of the driveshaft 29. By contrast, "trailing" refers to that portion of a blade 12 that will pass a predefined point last located in the plane of rotation of the blade cutting apparatus 10.

According to the present invention, each blade 12 is defined by a leading portion 14 and a trailing portion 16. Each blade 12 is further defined by an elongated slot 18 formed therein between the leading portion 14 and the trailing portion 16 for allowing grass and debris to pass through the blade 12 as the blade 12 cuts through strands of grass. Further details regarding the elongated slot 18 are discussed later in this application.

The leading portion 14 is defined by a first leading edge 20 and a first trailing edge 22. The first leading edge 20 is sharpened for providing a first rotary means to cut grass when using a conventional rotary lawn mower. As illustrated in FIGS. 1 and 2, the first leading edge 20 may have a concave configuration to more effectively throw cut grass outward as the blade cutting apparatus 10 is rotated.

The trailing portion 16 is defined by a second leading edge 24 and a second trailing edge 26. The second leading edge 24 is sharpened like the first leading edge 20 for providing a second rotary means on the blade cutting apparatus 10 for cutting grass when the blade cutting apparatus is installed on a conventional rotary lawn mower. The second leading edge 24 may be raised relative to the first cutting edge 20 for enabling the second leading edge 24 to cut grass a second time after being cut a first time by the first leading edge 20. Accordingly, the blade cutting apparatus 10 of the present invention enables rotary lawn mowers to cut grass more finely than conventional rotary lawn mowers.

The elongated slot 18 is bounded on opposite side by the first trailing edge 22 and the second leading edge 24. Preferably, the elongated slot 18 has a transverse dimension of approximately 1 inch and a length of approximately 2¾ inches for enabling grass and other debris to pass through a blade after being cut. Each end of the elongated slot 18 has an rounded contour that is expanded relative to the length of the elongated slot 18 for enabling grass and debris to pass more easily through the blade than other portions of the slot 18, thereby preventing collection of grass and debris at the ends of each slot 18.

In addition to the first leading edge 20 and the second leading edge 24, the outermost edge 32 of each blade 12 radially is also sharpened for enabling the outermost edge 32 to be used for cutting grass and debris along the perimeter of the blade cutting apparatus 10. Accordingly, the blade cutting apparatus 10 of the present invention is able to more effectively cut a plot of grass than conventional blade cutting apparatuses for rotary lawn mowers.

A circular hole 28 is formed in the center of the blade cutting apparatus 10 for receiving a shaft therethrough. The circular hole 28 is dimensioned to a size marginally exceeding the size of a drive shaft 29 of a conventional lawn mower for enabling the blade cutting apparatus 10 to fit snugly over a drive shaft 29 to rotatably drive the blade cutting apparatus 10.

A second slot 30 may also be formed in each blade 12 located substantially at the center of the blade cutting apparatus 10 for receiving a conventional bolt therethrough, thereby facilitating placement of the blade cutting apparatus 10 in a predefined position on the drive shaft 29. The second slot 30 is sized marginally greater than the diameter of a conventional bolt for enabling the bolt to fit snugly in the second slot 30.

It is to be understood that the present invention is not limited to the sole embodiments described above, but encompasses any and all embodiments within the scope of the following claims.

We claim:

1. A blade cutting apparatus for a rotary lawn mower, comprising:

a plurality of equally spaced apart blades formed integrally with a central portion and projecting radially outward from the central portion, each of said blades having a leading edge and a trailing edge terminating at an outer end, said leading edge being curved towards the trailing edge at the outer end to define a convexly curved sharpened edge and a correspondingly curved trailing edge;

each of said blades defining an elongated slot formed therein, said elongated slot having a sharpened interior edge adjacent the trailing edge, the sharpened interior edge of said slot being raised with respect to said leading edge;

said central portion including a mounting hole for receiving a shaft of the rotary lawn mower; whereby upon rotation of the blade cutting apparatus, the curved sharpened edge of each of the blades and the sharpened interior edge of the elongated slot cut through grass while cut grass and debris are allowed to pass through the slot.

2. The blade cutting apparatus according to claim 1, wherein said plurality of blades includes two said equally spaced apart blades.

3. The blade cutting apparatus according to claim 1, wherein said plurality of blades includes four said equally spaced apart blades.

* * * * *